F. A. FELDKAMP.
APPARATUS FOR ELECTROPLATING HOLLOW TAPES, RIBBONS, OR BANDS.
APPLICATION FILED DEC. 7, 1912.
1,071,037.   Patented Aug. 26, 1913.
10 SHEETS—SHEET 3.
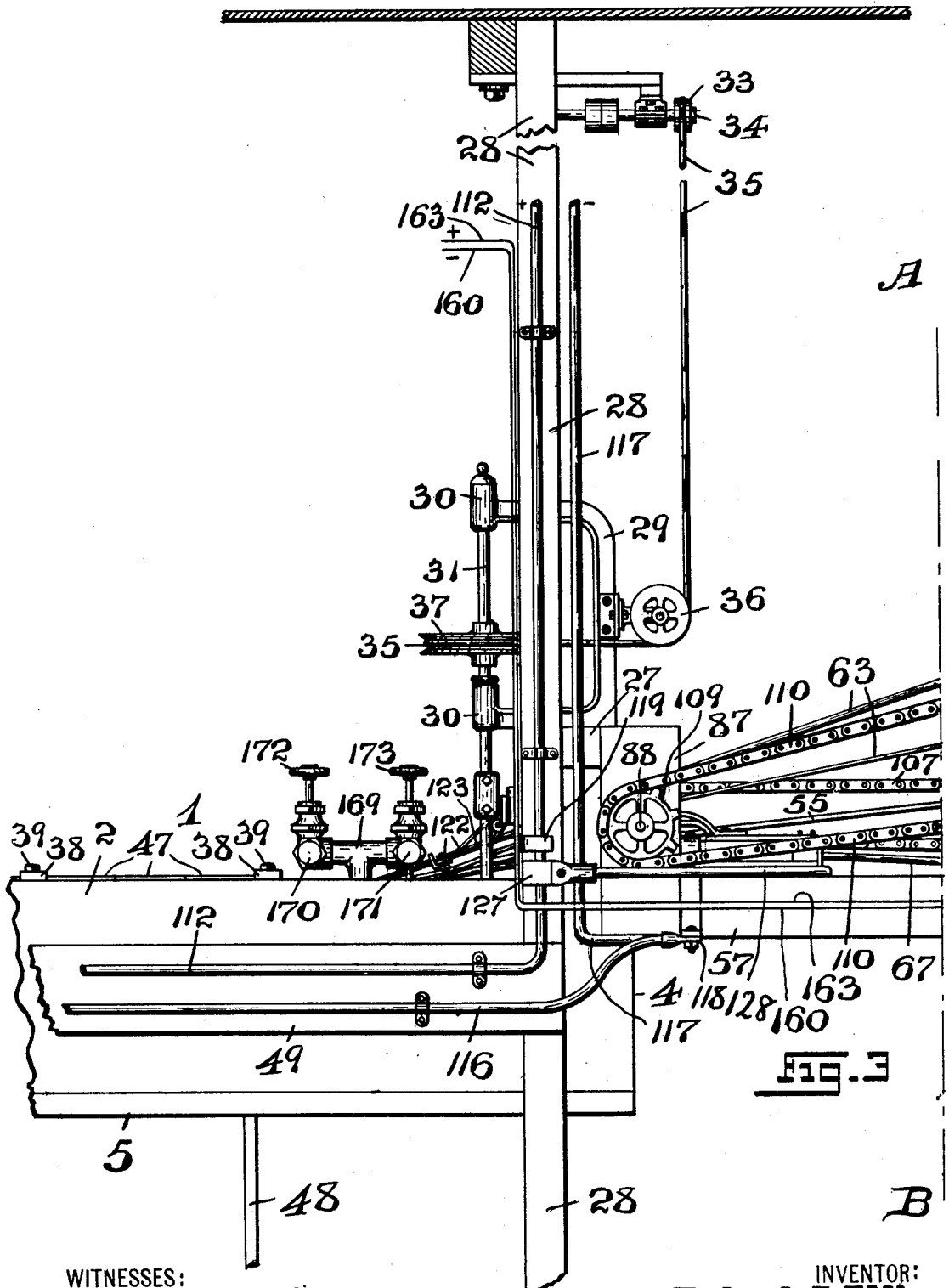
WITNESSES:
Fredk. W. Fraentzel
Harry E. Pfeiffer
INVENTOR:
Frederick A. Feldkamp,
BY
Fraentzel and Richards,
ATTORNEYS

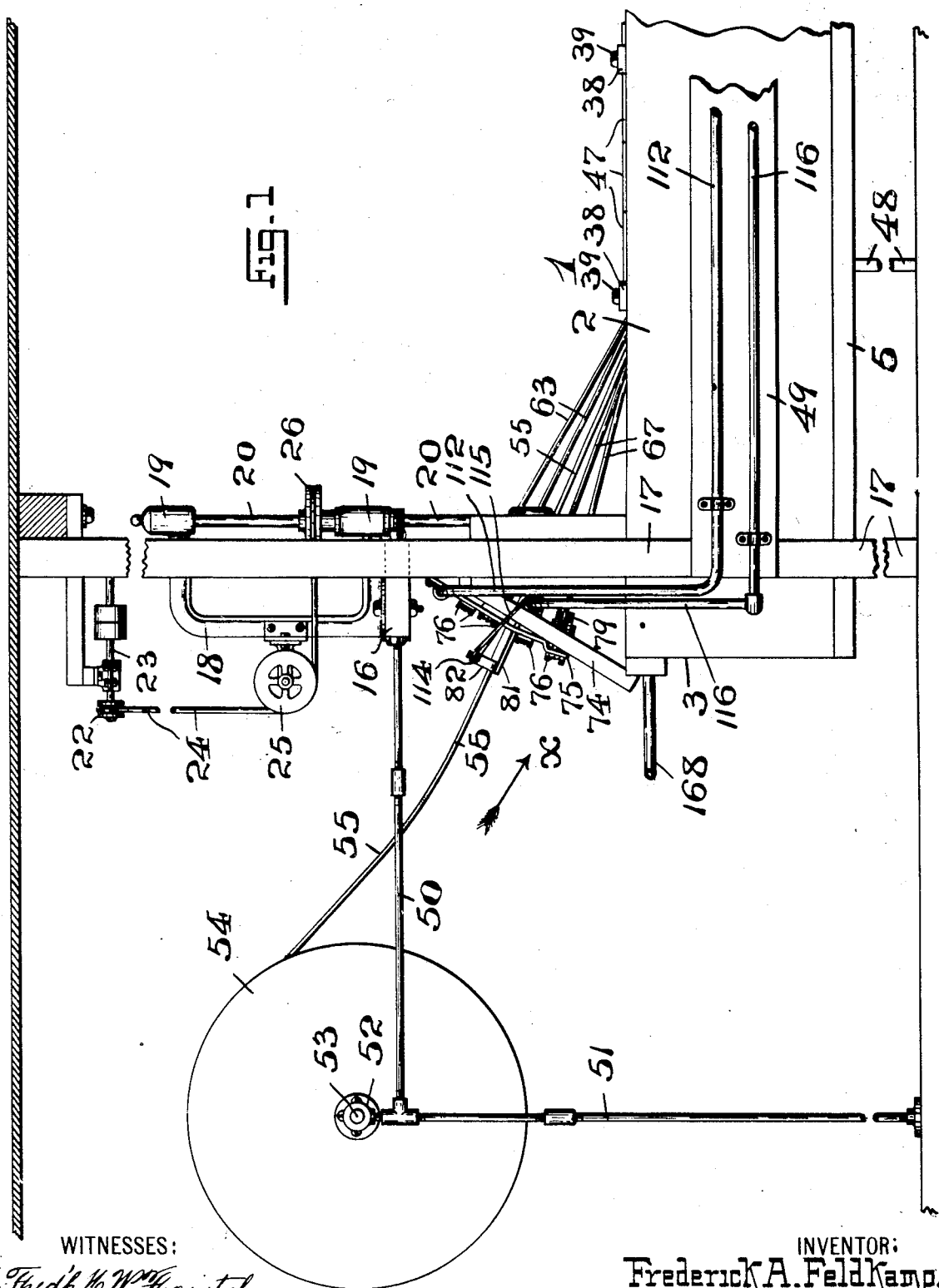

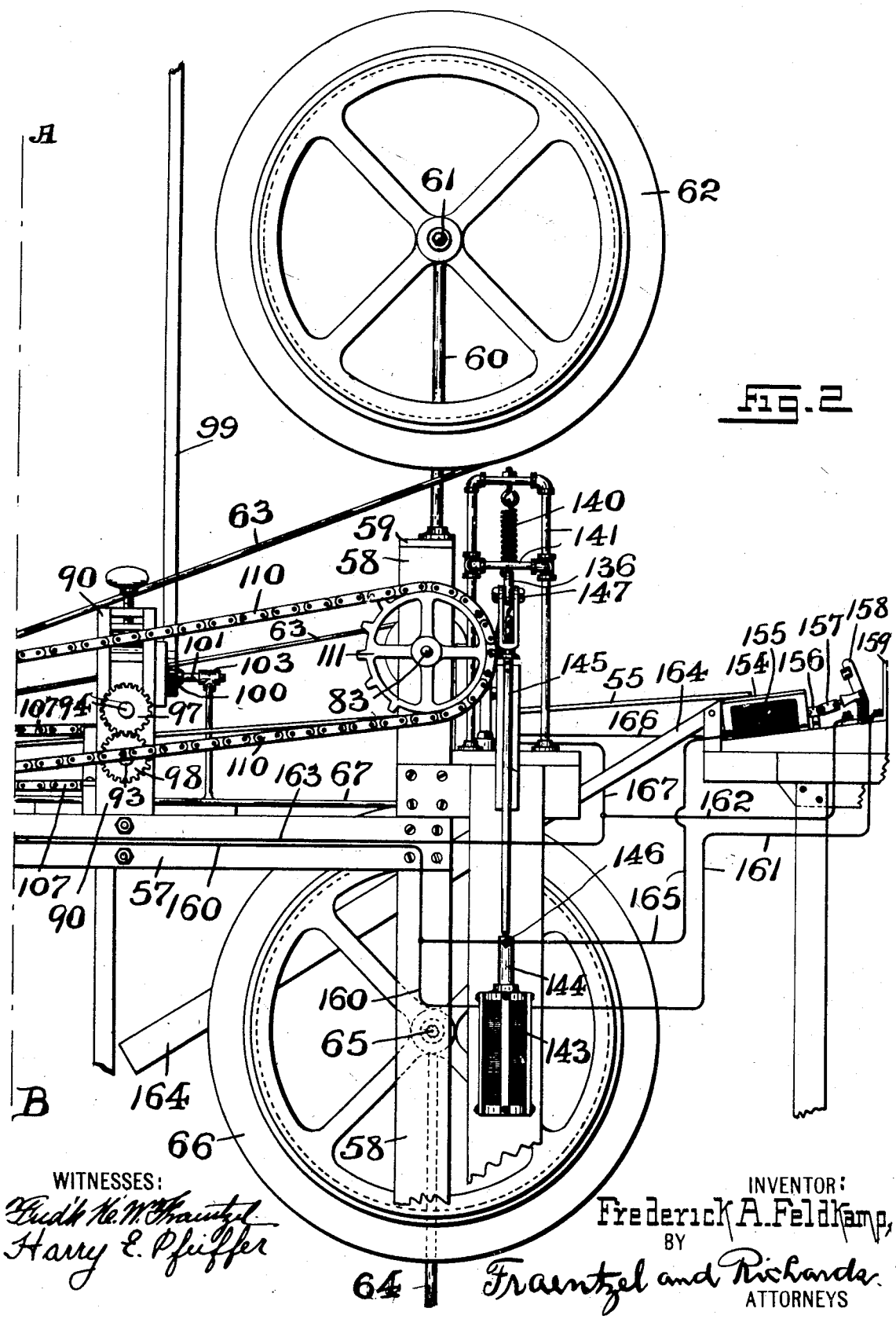

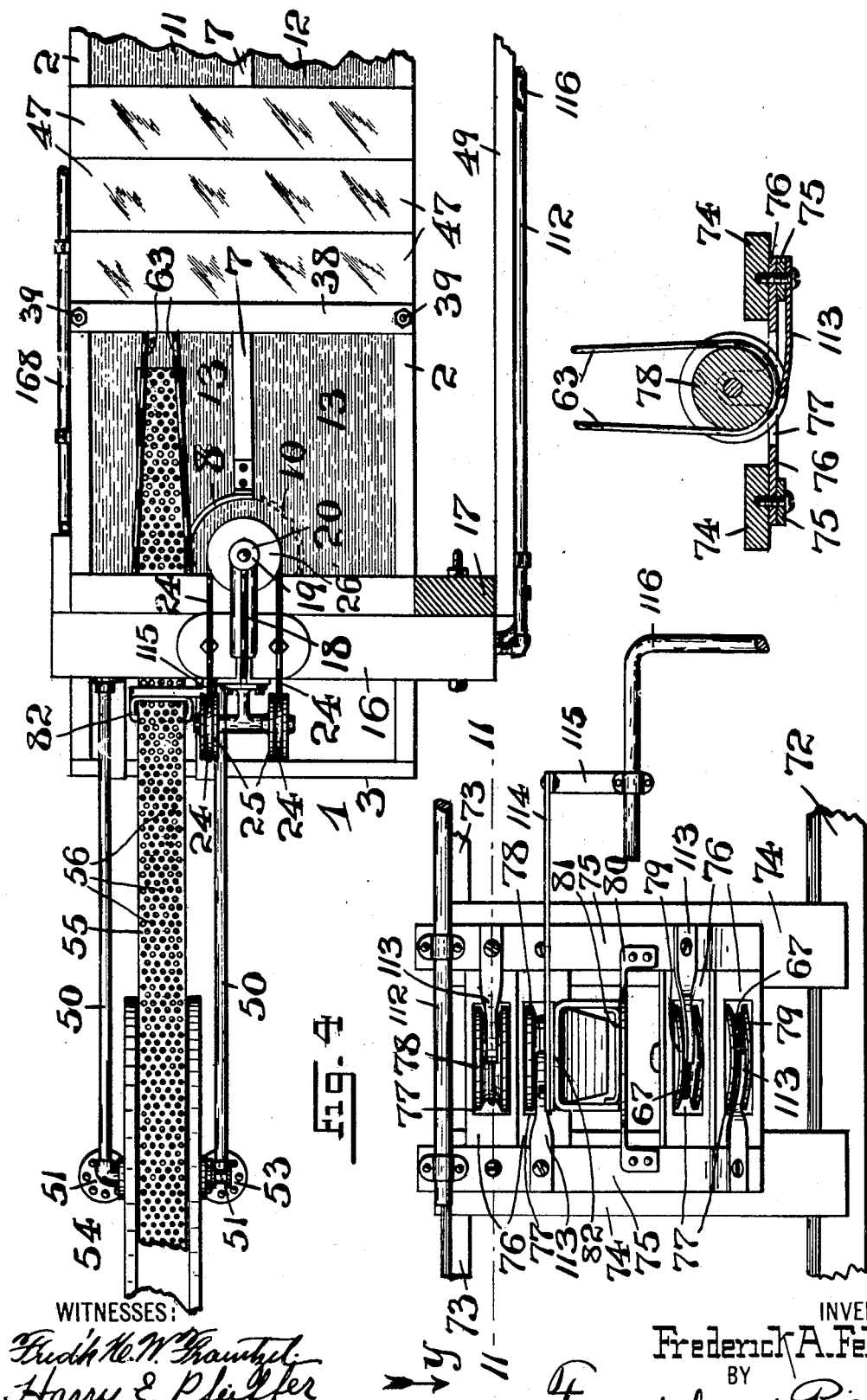

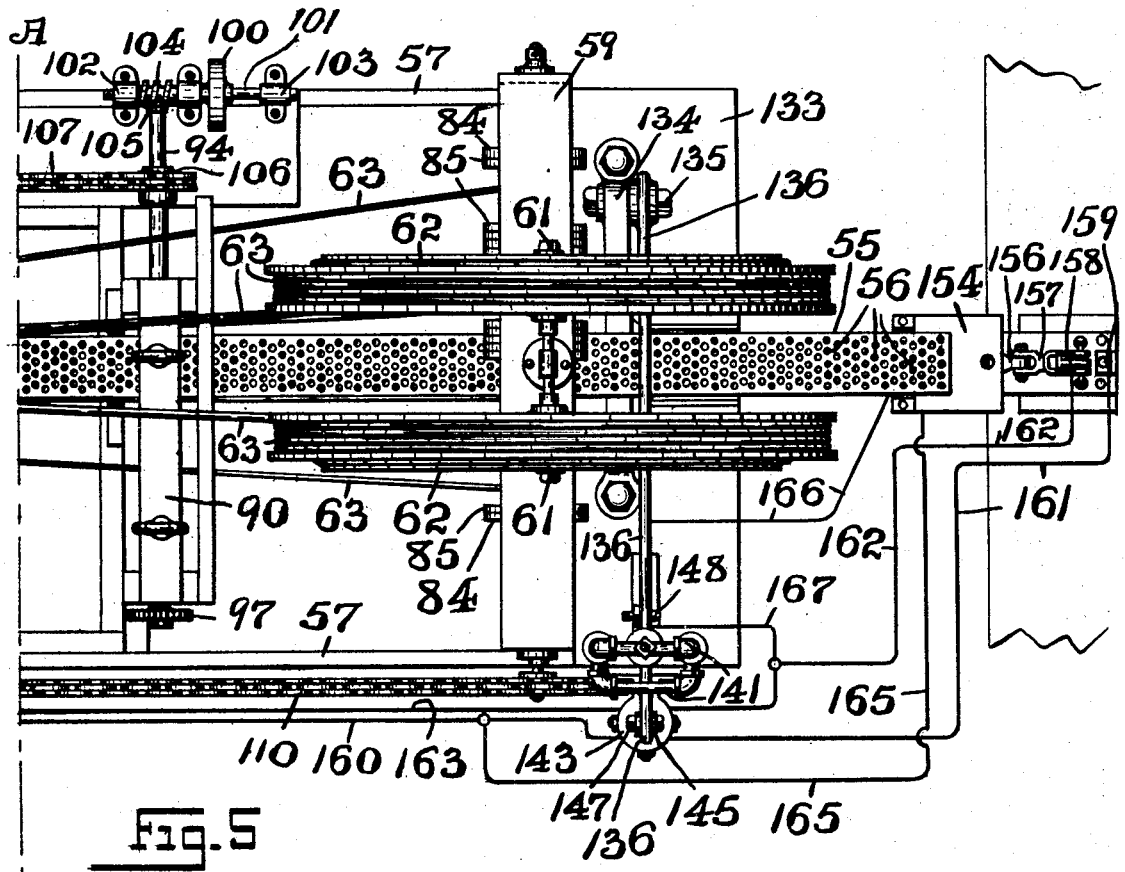
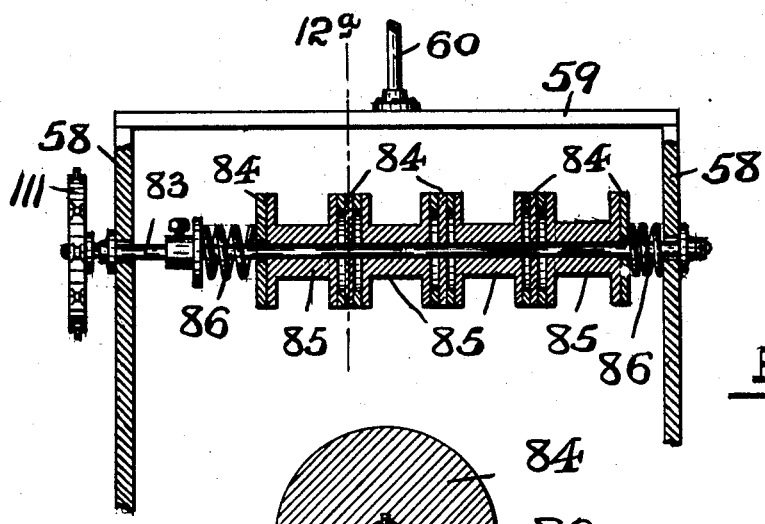
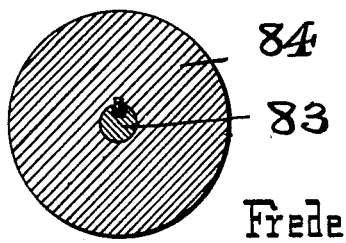

F. A. FELDKAMP.
APPARATUS FOR ELECTROPLATING HOLLOW TAPES, RIBBONS, OR BANDS.
APPLICATION FILED DEC. 7, 1912.
1,071,037.
Patented Aug. 26, 1913.
10 SHEETS—SHEET 6.
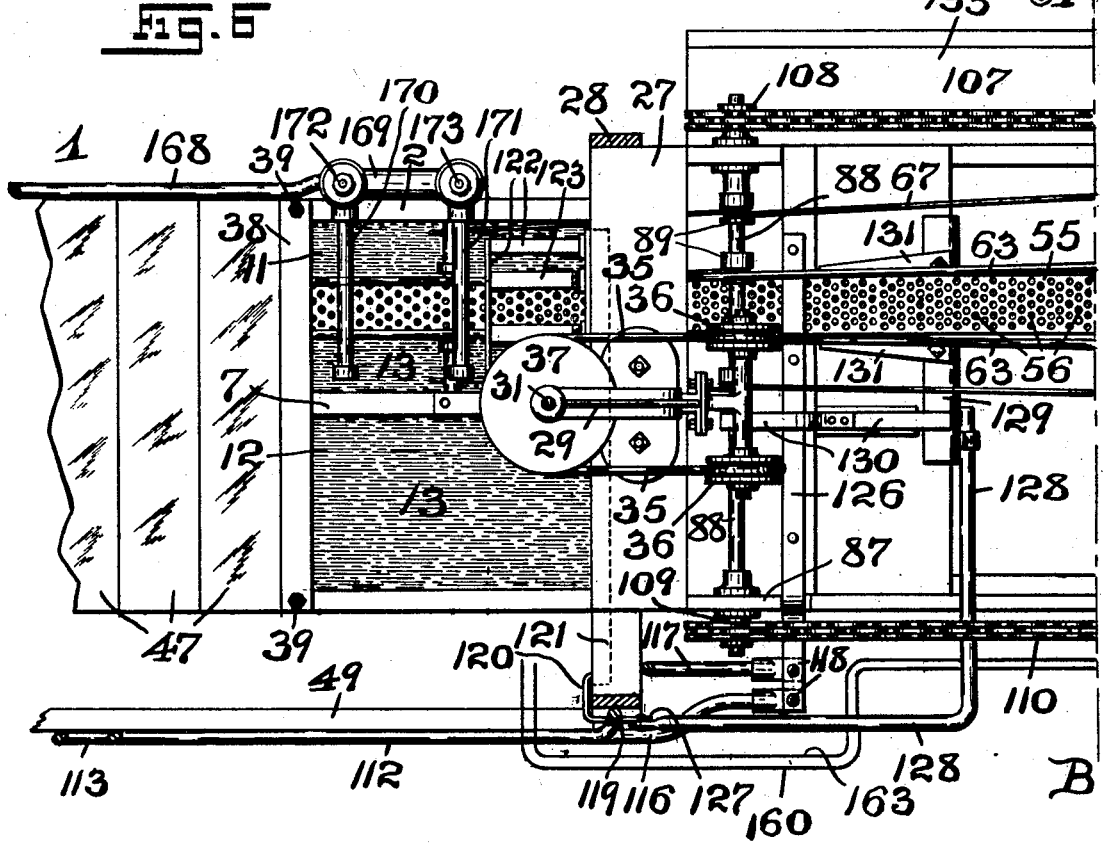
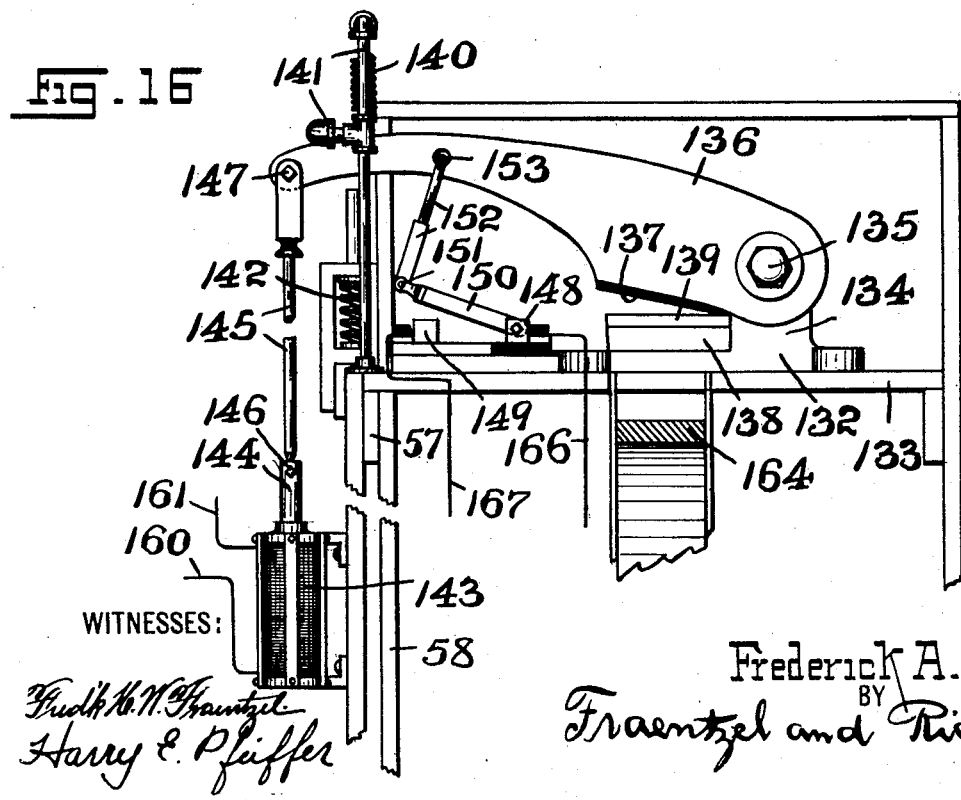
WITNESSES:
INVENTOR:
Frederick A. Feldkamp,
BY Fraentzel and Richards,
ATTORNEYS F. A. FELDKAMP.
APPARATUS FOR ELECTROPLATING HOLLOW TAPES, RIBBONS, OR BANDS.
APPLICATION FILED DEC. 7, 1912.

1,071,037.

Patented Aug. 26, 1913.

Fig. 7.

INVENTOR:
Frederick A. Feldkamp,
BY
Fraentzel and Richards,
ATTORNEYS

WITNESSES:
Fredk. H. W. Fraentzel
Harry E. Pfeiffer

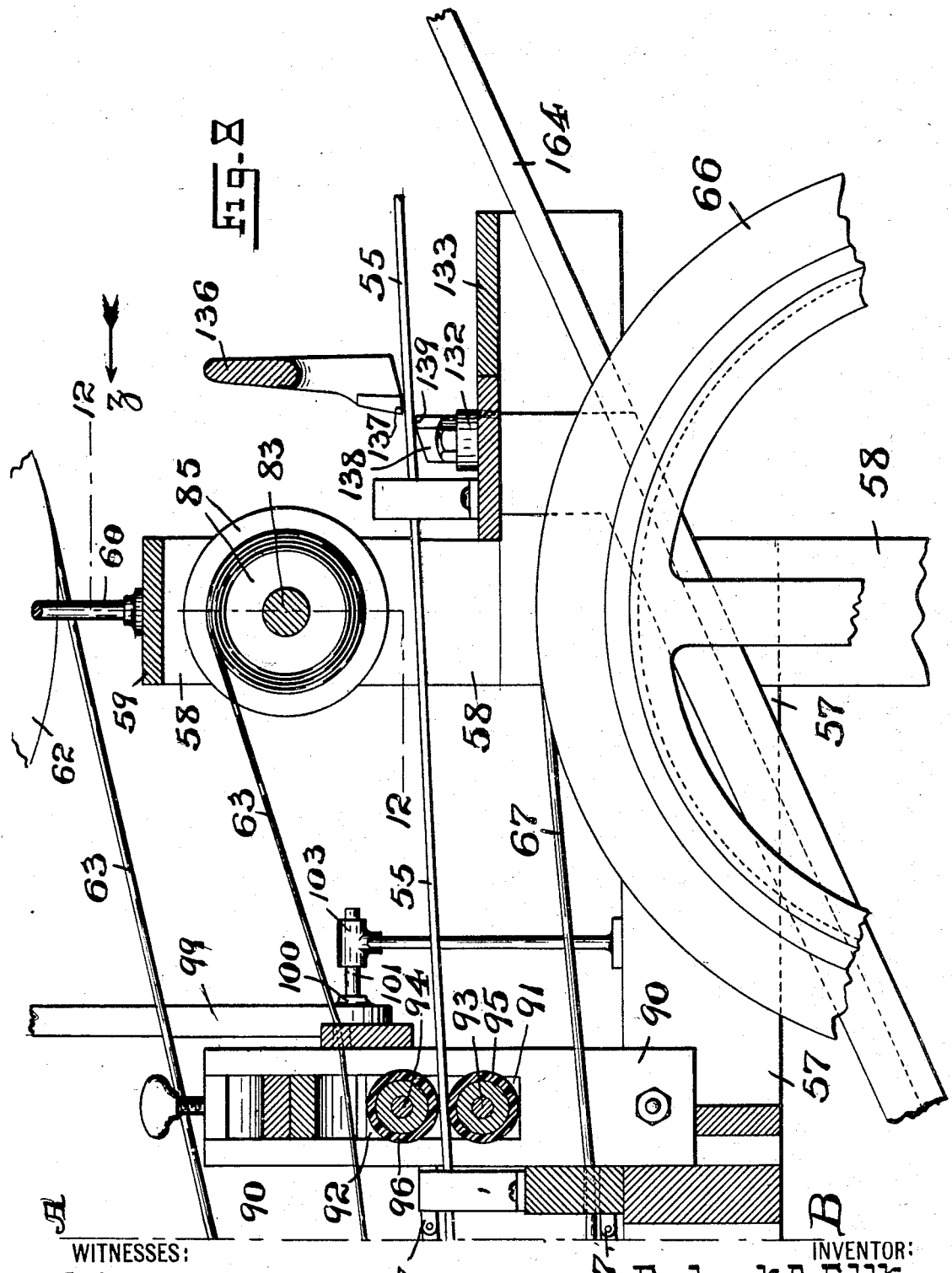

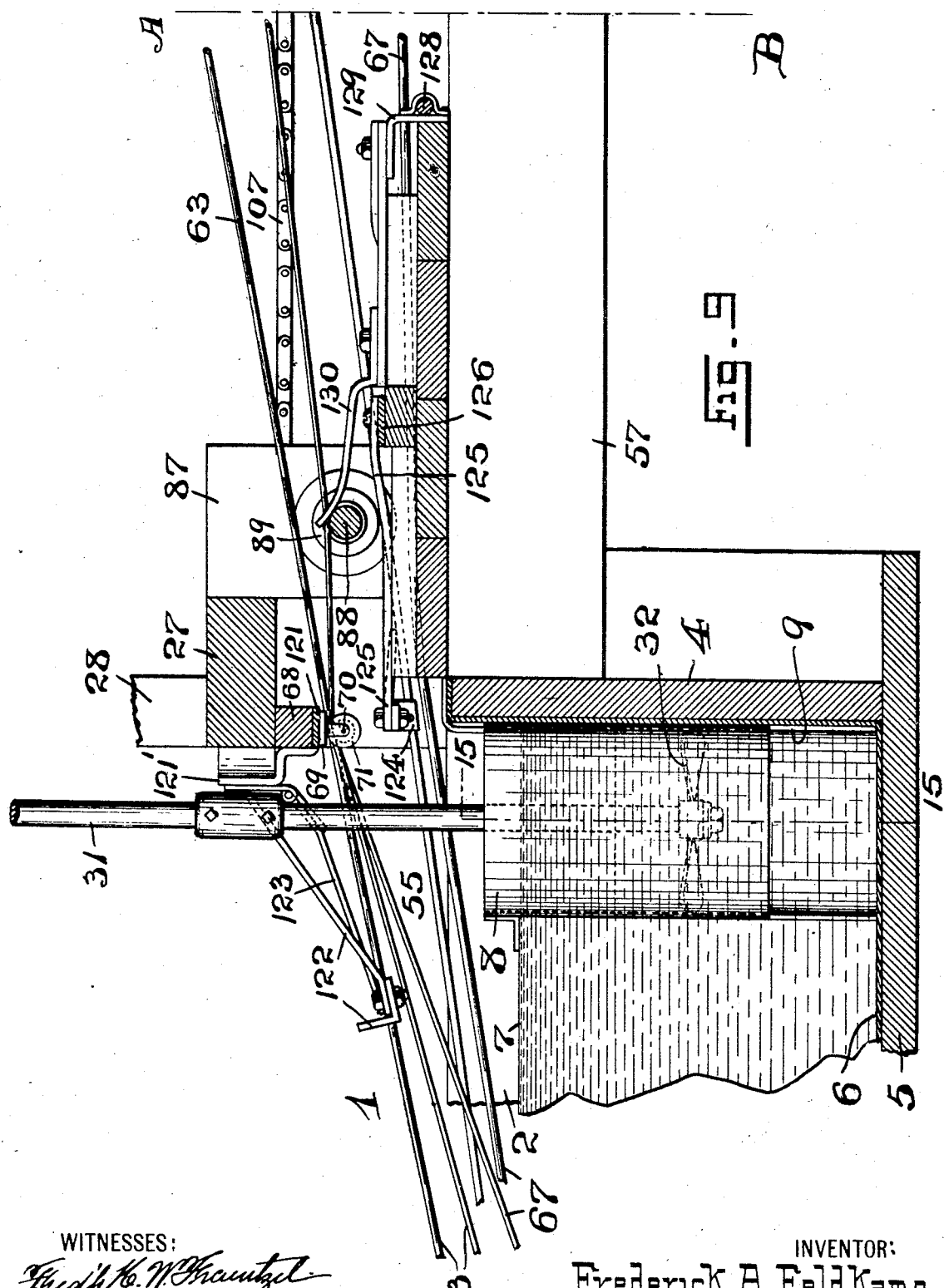

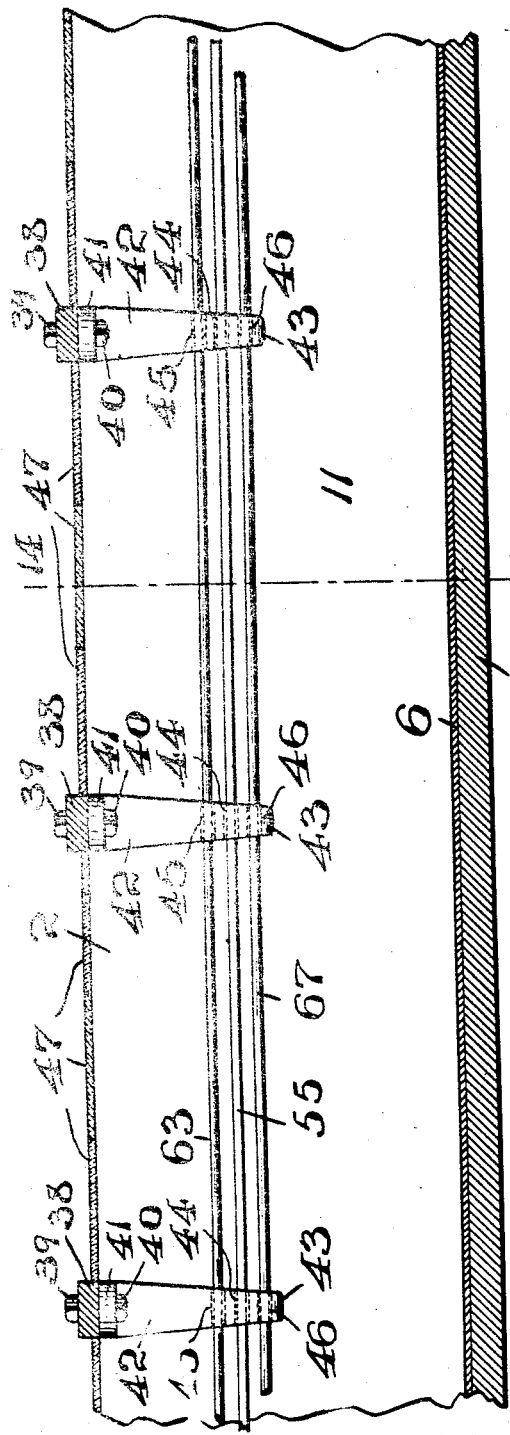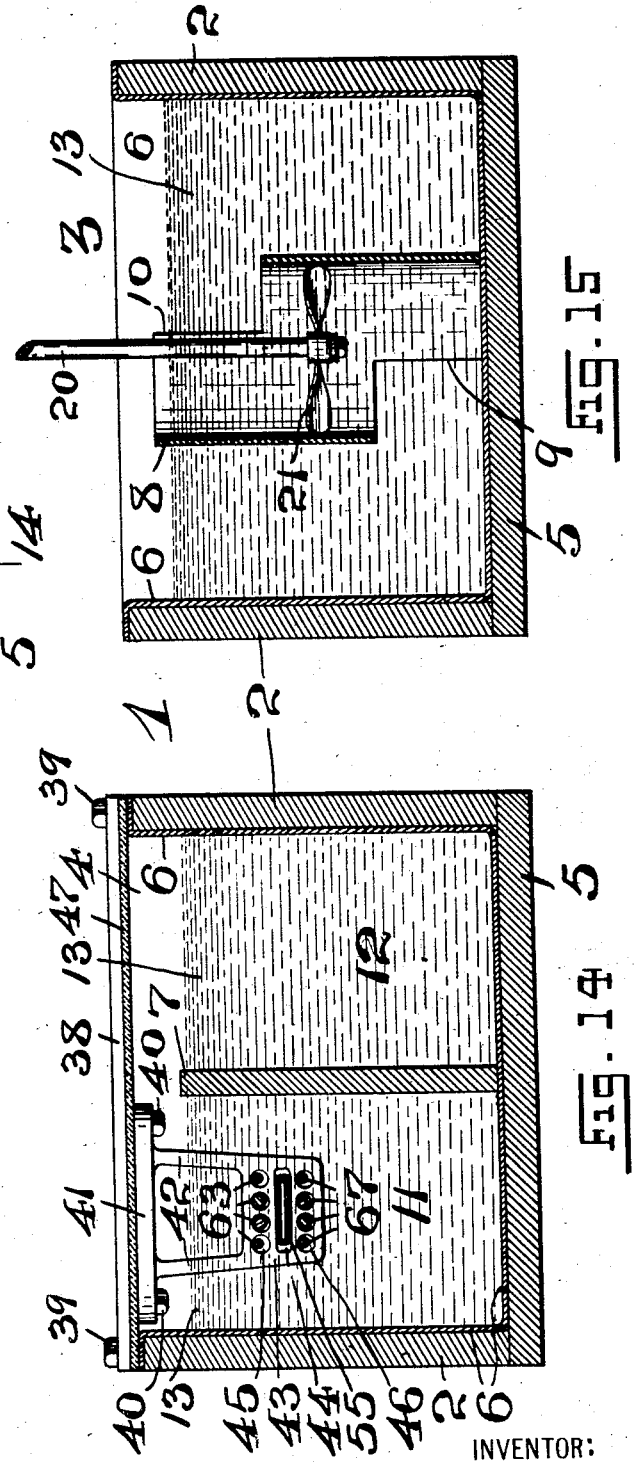

UNITED STATES PATENT OFFICE.

FREDERICK A. FELDKAMP, OF NEWARK, NEW JERSEY, ASSIGNOR TO ELECTROLYTIC PRODUCTS CO., A CORPORATION OF NEW JERSEY.

APPARATUS FOR ELECTROPLATING HOLLOW TAPES, RIBBONS, OR BANDS.

1,071,037.

Specification of Letters Patent. Patented Aug. 26, 1913.

Application filed December 7, 1912. Serial No. 735,365.

*To all whom it may concern:*

Be it known that I, FREDERICK A. FELD-KAMP, a citizen of the United States, residing at Newark, in the county of Essex and State of New Jersey, have invented certain new and useful Improvements in Apparatus for Electroplating Hollow Tapes, Ribbons, or Bands; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention relates, generally, to improvements in apparatus employed in the art of electro-deposition; and, the invention has reference, more particularly, to a novel apparatus and mechanism which is especially adapted for the production of one-piece metal structures in the form of hollow tapes, ribbons, or bands, to be used more particularly in the construction of radiators for automobiles, and radiators generally, as set forth in my former application for Letters-Patent therefor, filed April 3rd, 1912, Serial No. 688,338, and allowed August 14, 1912; and, which apparatus is also adapted for use with the "Method or process of producing hollow tapes, ribbons or bands of metal," for which I did also make application for Letters-Patent, filed April 12, 1912, Serial No. 690230.

The present invention, therefore, has for its principal object to provide a novel and simply constructed apparatus or mechanism of the general character hereinafter set forth and for the purposes hereinbefore stated, by means of which such hollow tapes, ribbons, or bands of metal may be rapidly produced electrolytically and in one piece in a most simple and perfect manner, and at a comparatively reduced cost.

Other objects of the present invention not at this time more particularly enumerated will be clearly understood from the following detailed description of the present invention.

With the various objects of the present invention in view, the said invention consists, primarily, in the novel apparatus or mechanism for the electro-deposition of metals hereinafter more fully set forth; and, the invention consists, furthermore, in the novel arrangements and combinations of the various devices and parts, as well as in the details of the construction of the same, all of which will be more fully described in the following specification, and then finally embodied in the clauses of the claim which are appended to and which form an essential part of this specification.

The invention is fully illustrated in the accompanying drawings, in which:—

Figure 1 is a side view of the one end-portion of the electro-plating tank and the mechanism located at said end of the tank; and Figs. 2 and 3 are sectional side elevations of the other end of the electro-plating tank and the mechanism located at said end, Fig. 3 being a continuation of Fig. 2 at the line A—B in both figures. Fig. 4 is a top or plan view of the various parts represented in said Fig. 1, the upper driving mechanism which is shown in said Fig. 1, however, being omitted from said view; and Figs. 5 and 6 are top or plan views, respectively, of the parts represented in said Figs. 2 and 3, said Fig. 6 being a continuation of said Fig. 5 at the line A—B in said figures. Fig. 7 is a longitudinal vertical sectional representation of the parts represented in said Figs. 1 and 5; Fig. 8 is a similar sectional representation of the parts represented in said Fig. 2; and Fig. 9 is a longitudinal vertical section of the parts represented in said Fig. 3, all of said views being made on enlarged scales. Fig. 10 is a detail face view of a certain portion of the apparatus or mechanism, looking in the direction of the arrow $x$ in Fig. 1; and Fig. 11 is a detail transverse sectional representation, said section being taken on line 11—11 in said Fig. 10, looking in the direction of the arrow $y$. Fig. 12 is a detail transverse vertical section, taken on line 12—12 in Fig. 8, looking in the direction of the arrow $z$; and Fig. 12$^a$ is a cross-section on line 12$^a$—12$^a$ in Fig. 12. Fig. 13 is a longitudinal vertical section of a portion of the electro-plating tank located between the end-mechanisms of the tank; Fig. 14 is a vertical cross-section of the electro-plating tank, said section being represented as being taken on line 14—14 in said Fig. 13; and Fig. 15 is a similar cross-sectional representation of the electro-plating tank, near the one end-portion thereof, said section being represented as being taken on line 15—15 in said Fig. 9, all of said views being made on enlarged scales. Fig. 16 is a face view of a cutting-off mechanism employed with the electro-plating apparatus for automatically cutting the electro-deposited metal band or strip into sections of suitable lengths.

Similar characters of reference are employed in all of the above described views, to indicate corresponding parts.

Referring now to the several figures of the drawings, the reference-character 1 indicates a suitably constructed electro-plating tank which may be of any desired width and length, the tank shown comprising longitudinally extending sides 2, the respective ends 3 and 4, and a base 5, the inner surface-portions of the tank thus formed by the said sides, ends and base being suitably lined with an acid-proof lining, as 6, as clearly shown in the several figures of the drawings.

The tank is usually and preferably centrally divided, as shown in the present case, by a longitudinally extending partition or wall 7, and located at each end 3 and 4, and within the tank, is a cylindrically formed tubular element or member, as 8. The end-edges of the said longitudinally extending partition or wall 7 abut directly against the respective elements or members 8, and each element or member 8 has a lower cut-away portion 9 and an upper cut-away portion 10, providing suitable openings which establish communication between the two longitudinally extending chambers 11 and 12, thus formed by the partition 7 and said elements or members 8 in the main body of the electro-plating tank, as will be clearly evident from an inspection of Figs. 7 and 9, and especially of Fig. 15 of the drawings. Suitably mounted upon a cross-bar 16 of the frame-work 17 at the one end 3 of the tank, is a bearing-member 18 which is provided with bearings 19 in which is rotatably mounted a vertical spindle 20, said spindle 20 having its lower end-portion extending down into the cylindrical element or member 8 within the main tank and near said end 3, and having mounted upon said lower end of the spindle a propeller or agitator, as 21. Rotary motion is conveyed to said vertical spindle 20 from a wheel 22 mounted upon a driven shaft 23 located above the said electro-plating tank, by means of a belt or flexible connection 24 which passes over said wheel 22, and over a pair of wheels 25 upon said bearing-member 18 and a wheel 26 mounted upon said spindle 20, substantially in the manner indicated in Fig. 1 of the drawings. In a like manner, there is suitably mounted upon a cross-bar 27 of the frame-work 28, at the other end 4 of the main tank, a bearing-member 29 which is provided with bearings 30 in which is rotatably mounted a vertical spindle 31, said spindle 31 having its lower end-portion extending down into the other cylindrical element or member 8 within the main tank and near said end 4, and having mounted upon said lower end of the spindle a propeller or agitator, as 32. Rotary motion is conveyed to said vertical spindle 31 from a wheel 33 mounted upon a driven shaft 34 located above said electro-plating tank, by means of a belt or flexible connection 35 which passes over said wheel 33, and over a pair of wheels 36 upon said bearing-member 29 and a wheel 37 mounted upon said spindle 31, as will be clearly seen from an inspection of Fig. 3 of the drawings. Thus it will be clearly evident, when the two propellers or agitators 21 and 32 are set in operation, and are made to rotate in the same directions, that a continuous circulation of the electrolyte 13 contained in the chambered electro-plating tank will be produced from the one chambered portion of the tank into and through the cylindrical element or member located at one end of the tank, and through the other chambered portion of the tank into and through the other cylindrical element or member located at the other end of the tank, back and into the said first-mentioned chambered portion of the electro-plating tank.

The purpose of the partition 7 hereinabove mentioned is two-fold. In the first place, it permits the apparatus to be used as a double one, one tank serving as two plating baths, as will appear from the following detailed description of the apparatus, and from an inspection of the drawings. In the second place, however, this partition permits of a more advantageous and rapid circulation of the electrolyte within the tank, and prevents, in long tanks as is here the case, any eddies of the electrolyte at the ends of the tank, that may be produced by the two propellers or agitators, and forcing the electrolyte from the ends of the tank toward the middle of the tank, where an objectionable "swash" of the electrolyte would consequently occur. Extending laterally across the said longitudinally extending chambers or compartments of the main electro-plating tank and resting upon the upper edges of the sides of said tank are suitably spaced supporting bars or plates 38 which are suitably secured in their fixed relations to the tank by means of tap-bolts 39, or other suitable fastening devices, and suitably secured to the under faces of the said supporting bars or plates 38, by means of tap-bolts 40, or other suitable fastening devices, are suitably disposed and suitably constructed supporting and guiding hangers, substantially as shown in Figs. 13 and 14 of the drawings. Each hanger, as will be seen from said Fig. 14, consists of a base-plate 41 from which extend downwardly a pair of arms, as 42, which are connected at their lower ends by a plate-like portion 43. Each plate-like portion is made with a laterally extending elongated opening, as 44, and with an arrangement of a plurality of holes or perforations 45 and 46, located, respectively above and below said elongated opening 44, in the manner illustrated in said Fig. 14. An arrangement of such supporting and guiding hangers may be placed in only one of said longitudinally extending chambers or compartments, as here shown, but it will be clearly understood that the means for electro-plating may be duplicated, if desired, in which case another set of such supporting and guiding hangers may also be placed in the other longitudinally extending chamber or compartment of the main tank.

Referring now to Figs. 13 and 14 of the drawings, it will be seen that upon the upper edges of the longitudinally extending sides of the main tank, so as to close the open spaces between the supporting cross-bars or plates 38, are suitably formed cover-plates, as 47, which are preferably made of glass so that the action of the electrolyte in the longitudinally extending chambers or compartments, as well the movements of the anode and cathode through the electrolyte may be clearly observed by the operator. The said main tank, as will be seen more particularly from an inspection of Figs. 1, 2 and 3, is supported upon suitable standards or frames 48, and the longitudinally extending side-pieces 49, suitably secured at their respective ends to the vertical members of the frame-work 17 and 28. Extending horizontally from the cross-bar 16 are a pair of rods 50 which are connected with a pair of vertical supporting rods 51 and bearing portions 52 in which are suitably journaled the ends of a spindle 53 carrying a reel 54, upon which is wound, and adapted to be unreeled therefrom, a long strip or band 55 of lead, or other easily fusible metal, of any suitable cross-section. This strip or band may also be provided with a multiplicity of suitably disposed holes or perforations 56, as will be seen from an inspection of Fig. 4 of the drawings. Extending from the other end 4 of the main tank are longitudinally extending side-pieces 57, the free ends of which are suitably connected with the vertical posts of a frame-work 58. Suitably mounted upon the top-member or cross-piece 59 of said frame-work 58 is a standard or post 60 provided at the top with oppositely extending journal-arms 61 upon each of which is loosely and rotatably mounted a reel 62, upon which is wound copper-wire, as 63, of a suitable gage. Suitably secured to the floor, and extending upwardly between the frame-work 58, is another standard or post 64 which is also provided at the top with oppositely extending journal-arms 65, see Fig. 2, upon each of which is loosely mounted a reel 66, upon which is wound a copper-wire, as 67, of the same gage as the wire 63.

Suitably secured to a cross-beam, as 68, which is attached to the lower surface of the cross-bar 27, substantially as represented in Fig. 9 of the drawings, is a bracket-like member 69, upon the spindle 70 of which are a number of grooved wheels or rollers 71. Upon the outer surface of the end 3 of the main tank is a bar 72 and secured to the frame-pieces 17 is another bar 73, and with their respective end-portions suitably secured to said bars 72 and 73 are angularly disposed members 74 which carry a metal frame 75. This frame 75 is made with bearing-members, as 76, formed with open portions 77, two of such open portions being located in the upper part of said frame, and another pair of such open portions being located in the lower part of the said frame. Rotatably arranged in each pair of said open portions 77 in the upper part of the frame 75 are suitably formed grooved wheels or rollers 78, and similarly rotatably arranged in each pair of said open portions 77 in the lower part of the frame 75 is another pair of suitably grooved wheels or rollers 79. Connected with the said frame 75, by means of a brace, as 80, or in any other suitable manner, is a guiding member or element of any suitable construction, and preferably in the form of a chute-like guide 81, over which the previously-mentioned strip or band 55 of lead is adapted to move and be properly guided into the electroplating tank at the end 3 thereof. The said chute-like guide 81 is also provided at its forward end with an upwardly extending ring-shaped or other suitably shaped member 82, the purpose of which will be hereinafter more fully specified.

Referring now more particularly to Fig. 12 of the drawings, it will be seen that there is rotatably mounted between the previously-mentioned uprights of the framework 58, a shaft or spindle 83 upon which are keyed or otherwise permanently secured, so as to revolve with said shaft or spindle 83, but, however, being capable of a sliding motion upon the said shaft or spindle, a series of friction disks or plates 84; and, loosely mounted upon said shaft or spindle, and being arranged between said disks or plates 84, with their sides in frictional contact with said disks or plates, are a series of winding-up reels 85. The frictional contact between the said reels 85 and the said disks or plates 84, which varies from time to time, during the operation of the apparatus as will hereinafter more fully appear, is produced by means of compression springs 86 which are suitably disposed upon said shaft or spindle 83 and coöperate with the other parts upon said shaft or spindle, as will be clearly understood from an inspection of said Fig. 12.

Rotatably mounted between a pair of frame-members 87, secured upon opposite sides of the apparatus to the cross-bar 27 and the longitudinally extending side-pieces 57, is a horizontal shaft 88 upon which are secured a number of tension or wire-pulling members 89, in this case in the form of four grooved rollers. Suitably mounted upon the frame-work of the apparatus, at a point between the said tension or wire-pulling members 89 and the winding-up reels 85 is a suitable frame-work, as 90, provided with suitably formed bearing-members 91 and 92 in which are rotatably mounted the respective shafts 93 and 94, which are respectively provided with suitably formed feed-rolls 95 and 96, rotary motion from the shaft being conveyed from a gear-wheel 97 upon said shaft to a gear-wheel 98 upon the shaft 93. Rotary motion is conveyed to said shaft 94 from an outside source of driving power by means of a belt 99 which runs upon a pulley-wheel 100 suitably mounted upon a shaft 101, running in bearings 102 and 103. This shaft has also secured thereon a worm 104 which meshes with a worm-wheel 105 upon said shaft 94, the parts being of such construction that the desired speeds of the feed-rolls and other parts of the apparatus will be obtained. It will be understood, however, that any other suitable driving mechanism may be employed, if desired. The said shaft 94 has also secured thereon a sprocket wheel 106 over which passes a link-chain 107 which also passes over a sprocket-wheel 108 upon the previously-mentioned shaft 88, upon which are mounted the tension or wire-pulling members or grooved rollers 89, for revolving said shaft 88. Upon its opposite end-portion, this shaft 88 has mounted thereon a sprocket-wheel, as 109, over which passes a link-chain 110, said link-chain 110 passing also over a sprocket-wheel 111 upon the shaft or spindle 83 for revolving said latter shaft, and the winding-up reels 85, in the manner herein-before set forth, by means of the friction disks and plates 84 upon said shaft 83.

Before starting the herein-above described mechanisms of the apparatus, prior to the electro-deposition of copper, or other metal, upon the previously-mentioned strip or band of lead 55, or other fusible metal, a sufficient length of the strip or band 55 is unreeled from its carrying reel 54, said reeled-off portion of the strip or band is first passed through the ring-shaped member 82, and upon chute-like guide 81 at the end 3 of the apparatus. The end-portion of said reeled-off portion of the strip or band 55 is then pulled through the one longitudinally extending chamber or compartment of the main electroplating tank and passed into and through the alined elongated openings 44 of the various supporting or guiding hangers hereinabove mentioned, the end-portion of the said strip or band 55 being passed in an upward direction from the other end 4 of the electroplating tank and arranged between and gripped by the said feed-rolls 95 and 96. Portions of the copper wires 63 are also unreeled from the two reels 62 and passed into the electroplating tank at the end 4 thereof. These reeled off portions of the two wires 63 are pulled into and through the same longitudinally extending chamber or compartment of the electroplating tank and into and through the respective holes or perforations 45 in said supporting or guiding hangers, the end-portions of the two wires 63 being passed in upward directions from the end 3 of the electroplating tank and passed about the previously-mentioned grooved wheels or rollers 78. From these grooved wheels or rollers 78 the end-portions of the two wires 63 are again passed into the electro-plating tank at the end 3 thereof, and into and through the other remaining holes or perforations 45 in said supporting or guiding hangers, the said end-portions of the two wires 63 being finally passed out of the electroplating tank at its end 4, and secured to two of the said hereinbefore mentioned winding-up reels 85. Thus, it will be seen, that the copper-wires 63, which serve as anodes during the electroplating process are arranged above the upper surface of the band or strip 55, which is the cathode and moves into one end of, through, and out of the other end of the electroplating tank, but said wires 63 moving similarly above said band or strip 55, into, through, and out of the tank, in one direction, and in the opposite direction once more into, through, and out of the tank. Similar portions of the copper wires 67 are also unreeled from the two reels 66 and passed into the electroplating tank at the end 4 thereof. These reeled off portions of the two wires 67 are also pulled into and through the longitudinally extending chamber or compartment of the electroplating-tank and into and through the respective holes or perforations 46 in said supporting or guiding hangers, the end-portions of the said wires 67 being passed in upward directions from the end 3 of the electroplating tank and passed about the other set of hereinabove-mentioned grooved wheels or rollers 79. From these grooved wheels or rollers 79 the end-portions of the two wires 67 are then again passed into the electroplating tank at the end 3 thereof, and into and through the other remaining holes or perforations 46 in said supporting or guiding hangers, the said end-portions of the two wires 67 being finally passed out of the electroplating tank at its end 4, and secured to another pair of said winding-up reels 85. It will thus be seen, that the said copper wires 67 are arranged below the lower surface of the said band or strip 55, and also serve as anodes, the said copper wires 67 moving also in reverse directions first, into, through, and out of the electroplating tank, and secondly, again into, through, and out of said tank, as will be clearly understood from an inspection of the several figures of the drawings.

The above described initial arrangement of the band or strip 55 and the wires 63 and 67 having been produced, the communicating chambers or compartments of the electroplating tank are supplied with the electrolyte to such a height that the supported portions of said band or strip 55 and of the wires 63 and 67 are immersed in the electrolyte, and that during the movements of the said anodes and cathode, into and from the electroplating tank, and through the electrolyte, by means of the driving mechanism herein-before described, the electro-deposition of copper from the anode takes place upon the cathode, as will be clearly understood.

Having thus, in a general way, described one form of apparatus which is especially adapted for use in the process or method of producing hollow electrolytically deposited tape, ribbon, or bands, it remains to more particularly set forth the manner of producing the finished article of manufacture.

The electrolytic solution having been placed in the main tank, the machinery is set in motion, the flat strips or band 55 of easily fusible metal being drawn through the tank, entering at the end 3 thereof. Simultaneously, the wires 63 and 67, also travel through the electrolyte, upon opposite sides of the band or strip, the said wires traveling in opposite directions to the movement of the band or strip 55, and then back again through the electrolyte in the tank, in the same direction of the movement of the said strip or band 55. The result is that the copper from the entering wire-anodes is uniformly distributed upon the entire surface-portions of the fusible metal-cathode band or strip 55, the reduced wire being reeled upon the reels 5, for future use, or other by-products; and, the uniformly copper-plated band or strip being continuously delivered at this opposite end 4 of the tank, and passing to a cutter, to be presently described in detail, where the electro-plated band or strip is cut into sections of desired lengths.

A complete electric circuit is established, from an outside source of electrical energy, through the apparatus by means of a main electric conductor 112, extending along the upright 28, at the end 4 of the apparatus, and along the one side of the apparatus to the frame 75. Suitably connected with said frame 75 are spring-like elements or brushes 113, having their free end-portions resting lightly in contact with the respective copper wires 63 and 67. The wires 63 and 67 serve to conduct the electric current into the electroplating tank, the current passing through the electrolyte, into the band or strip 55, and thence through the chute-like guide 81 and the ring-shaped member 82, and a pair of connector-plates or bars 114 and 115, through a return electric conductor 116, which is arranged upon the side of the apparatus, and is electrically connected by means of a suitable electrical connection, as 118, with the main return electric conductor 117.

In order to insure perfect electrical connections, and a positively acting electric depositing circuit, there is preferably secured in any suitable manner to the main electric conductor 112, as at 119, a conductor-plate or strip 120 which is connected with a laterally extending metal bar or plate 121. This bar or plate 121, as will be seen from an inspection of Fig. 6 of the drawings, is electrically connected by means of a metal plate 121', see Fig. 9, with a suitably-constructed metal frame 122 in which are mounted suitable spring-like members or brushes 123 which are in slidable electrical contact with the upper arrangement of wires 63 near the end 4 of the apparatus. The wires 63 serve to conduct the electric current through the electrolyte in the tank into the metal band or strip 55, and by means of a spring-brush 124 and an arm 125, said brush 124 having its one end-portion in slidable contact with the band or strip 55 as it passes out of the electroplating tank, the circuit is completed through said arm 125 with a contact-band or strip 126 and the electrical connection 118 with the main return electric conductor 117.

Electrically connected with a portion 127 of the conductor-plate or strip 120 is another electric conductor 128 which makes contact with a conduct-bar 129. Extending from this bar 129 are spring-like brushes 130 and 131, the brushes 130 being in electrical contact with the shaft 88, which conducts the electric current by means of the tension or wire-pulling members or grooved rollers 89 to the several copper wires leading out of the electroplating tank. The electric current is also conveyed through the bar 129 to the brushes 131 which make electrical contact with the wires 67 as they pass into the electro-plating tank. These several "coming-in" and "going-out" wires convey the electric current into the electrolyte, to the outcoming band or strip 55, the circuit being completed, as above stated, through the spring-brush 124, the arm 125, the contact-band or strip 126, and the electrical connection 118, with the main return electric conductor 117, as will be clearly evident.

In connection with the herein-before described apparatus there may be employed a suitably constructed cutting-means, which is electrically controlled and acts automatically to cut or separate the copper-plated band, as it leaves the end 4 of the electroplating tank, into short sections. One arrangement and operation of such cutting-means is more particularly illustrated in Figs. 2, 5 8 and 16 of the drawings, and consists, essentially, of a suitable base 132, suitably mounted upon a portion 133 of the frame-work of the apparatus, said base 132 being provided with an upwardly extending and perforated post 134 upon which is pivotally supported, by means of a pivot or bolt 135, a suitably formed cutter-arm 136 provided with a knife or cutting-edge 137. This knife or cutting-edge 137 is adapted, during the downward stroke of said arm 136, to be brought into cutting registration with the cutting edge-portion 139 of a suitably formed cutter-bed or plate 138. The normally raised relation of the said cutter-arm 136 is produced, preferably, by means of a coiled spring 140, one end of which is secured to said arm 136 and the other end of the spring 140 being secured to a frame 141 which is also mounted upon the portion 133 of the main frame-work of the apparatus. The reference-character 142 indicates a cushioning or shock-absorbing spring with which the said arm 136 is adapted to be brought into contact during the downward stroke of said arm. Suitably secured to the framework of the apparatus is a solenoid, as 143, with the plunger 144 of which is pivotally connected, as at 146, a connecting-rod 145, said rod 145 having its upper end-portion also pivotally connected, as at 147, with the free end-portion of the said cutter-arm 136. Upon the base 132 of said cutting means is also suitably secured an electric switch-plate, as 148, formed with a switch-contact, as 149. Pivotally connected with said switch-plate 148 is a switch-arm 150, to the free end of which is pivotally connected, as at 151, an actuating link 152, the upper end-portion of which is pivotally connected with the cutter-arm 136, as at 153. From an inspection of said Fig. 16, it will be seen, that during the downward stroke of the said cutter-arm 136, the said link 153 moves the switch-bar or arm 150 into its electrical contact or circuit-establishing relation with the switch-contact 149 for the purposes to be presently more fully set forth.

In alinement with the outwardly moving end-portion of the copper-plated band is a supporting frame, as 154, in which is mounted another solenoid, as 155. Pivotally connected with the plunger 156 of this solenoid is a link-connection, as 157, with which is suitably connected a pivotally arranged and spring-controlled contact-arm or lever 158, adapted at the proper time to be forced into a tilted position so that it will make electrical contact with a suitable contact-post or bar, as 159.

As will be seen from an inspection of Fig. 2 of the drawings, the outwardly moving copper-plated end-portion of the fusible metal band, having passed between the two normally separate cutting portions 137 and 139 of the cutting-mechanism, moves upon the frame 154 and is brought into mechanical contact with the arm or lever 158, thus tilting said arm or lever toward the contact-post or bar 159, until said arm or lever is brought into engagement with said post or bar. Immediately an electric circuit is established through a main circuit-wire 160, the solenoid 143, a circuit-wire 161 between said solenoid 143 and the contact-post or bar 159, through the said contact-post or bar 159, and the movable contact-arm or lever 158 in contact with said post or bar 159, the electric circuit being completed by means of a circuit-wire 162 with the return main-circuit wire 163, to the main source of electrical energy, with which the said main circuit-wires 160 and 163 are connected. A complete electric circuit having thus been established through the solenoid 143, and the latter having thus become energized, the plunger 144 is drawn in a downward direction into the coil of the solenoid, with the result that the cutter-arm 136 is suddenly moved in a downward direction, thereby causing its knife or cutting-edge 137 to cut off a section of the electro-plated band, as will be clearly understood. As soon as this piece of plated band has been cut-off, it drops into a chute 164 and passes into a receptacle placed at the end of the chute for the collection therein of the several cut-off sections.

Simultaneously with the cutting operation of the cutter-arm 136, the previously-mentioned switch-bar or arm 150 makes an electrical contact with the switch-contact 149, whereby a complete electric circuit is established through the main circuit-wire 160, a circuit-wire 165, the solenoid 155, and a circuit-wire 166, through the switch-arm 150 and switch-contact 149, and a circuit-wire 167, through the main return-circuit wire 163, whereby the solenoid 155 becomes energized and draws the plunger 156 into said solenoid. This action causes the contact-arm or lever 158 to be returned to its normal initial position, thereby breaking the electrical contact between said arm or lever 158 and the contact-post or bar 159, so that the electric circuit through the solenoid 143 is interrupted. This interruption permits the distended spring 140 to return the cutter-arm 136 to its raised position, without interfering with the movement of the next portion of the electro-plated band, ready for its next cutting operation to be performed in the manner just described.

The reference-character 168 indicates a suitable water-conveying pipe which communicates with a T-shaped fitting or element, as 169, provided with a pair of laterally extending sprinkler-pipes 170 and 171, and shut-off valves 172 and 173. The sprinkler-pipes 170 and 171, as will be seen from an inspection of Fig. 6 extend above and over the electroplating tank, and are for the purpose of spraying the electroplated metal band and copper wires, prior to their passing from the end 4 of the electroplating tank, and to cleanse the said band and wires from any of the electrolyte that may adhere thereto.

After the electroplated band has passed from the end 4 of the electroplating tank and has been cut or severed into sections of suitable lengths, the fusible lead or other metal core within each section is thereupon removed from the copper shell or skin, by the application of heat, in any suitable manner, the said metal core being of such readily fusible metal that it easily clears itself from the electrodeposited copper shell, and readily flows from within the said copper shell or skin.

From the foregoing description, and from an inspection of the drawings, it will be clearly evident, that by the use of comparatively heavy wires moving, as anodes, into and through the electrolyte, these wires are constantly being reduced, so that their cross-sectional areas become less, and the wires will pass out of the electro-plating tank, after the reduction, in comparatively thin wires. The arrangement of the several wires is such that at the place or point of the heavy in-passing wires, there will also be the thin or greatly reduced out-going wires. The reduction of the wires is such, so that the sum-total of the cross-sectional areas of all the wires will be the same, or approximately the same. Thereby an absolutely uniform deposit from the wire-anodes constantly moving through the electrolyte and out again is obtained, since the surfaces of the anodes and the cathode do not change in size during or after any length of time; and this, so far as I am at present aware, is possible only by continuously feeding into and out of the electro-plating tank, anodes in the form of wires. In practice, I have found it desirable to use for the in-going wires, wires of No. 7 or 8 gage, which pass from the tank as out-going wires of No. 20 gage.

In the usual electro-plating processes, there is always a loss in the anodes of about 50 per cent., in the form of scrap copper, while with the present method of passing the reduced wire automatically from the tank upon reels, there is no labor required in handling or removing the scrap-anodes from the tank; and, furthermore, there will be no loss of electrolyte clinging to the scrap anodes as they are being removed. It will also be evident, in the present case, that the reduced wire, say to a No. 20 gage, as a by-product, has a greater market value than the No. 7 or 8 gage of the in-passing wire-anodes. Therefore, there not only is no loss in anode-copper, but a more valuable article, in the form of a thin copper wire which is produced from the less valuable copper wire passed into the electroplating tank during the process of electroplating, besides the great saving in labor and electrolytic solution. Of course it will be understood, that according to existing conditions and the work to be performed, in-going wires of larger or smaller gage may be used, the outgoing wires during the process of plating being reduced accordingly, and the time of movement of the wires through the electrolyte also being varied as occasion demands.

Of course I am fully aware that some changes may be made in the general arrangements and combinations of the various devices and parts, as well as in the details of the construction of the said parts, comprising the herein-above described electroplating apparatus, without departing from the scope of the present invention as set forth in the foregoing specification and as defined in the clauses of the claims which are appended thereto. Hence, I do not limit my present invention to the exact arrangements and combinations of the said devices and parts as described in the said specification, nor do I confine myself to the exact details of the construction of the said parts as illustrated in the accompanying drawings.

I claim:—

1. In an electroplating apparatus, a tank adapted to contain an electrolyte, means for continuously drawing a band of metal, forming the cathode, into said tank, through the electrolyte in said tank, and out of said tank, and means for drawing wire, forming the anode, into said tank, through the electrolyte in said tank, and out of said tank.

2. In an electroplating apparatus, a tank adapted to contain an electrolyte, means for continuously drawing a band of metal, forming the cathode, into said tank, through the electrolyte in said tank, and out of said tank, means for drawing wire, forming the anode, into said tank, through the electrolyte in said tank, and out of said tank, and a cutting means for severing the electroplated band into sections.

3. In an electroplating apparatus, a tank divided by a partition so as to provide the tank with longitudinally extending compartments adapted to contain an electrolyte, said compartments having a means of communication at their respective ends, and agitating devices located in said compartments for producing a continuous circulation of the electrolyte through said compartments.

4. In an electroplating apparatus, a tank divided by a partition so as to provide the tank with longitudinally extending compartments adapted to contain an electrolyte, said compartments having a means of communication at their respective ends, agitating devices located in said compartments for producing a continuous circulation of the electrolyte through said compartments, means for continuously drawing a band of metal, forming the cathode, into said tank, through the electrolyte in said tank, and out of said tank, and means for drawing wire, forming the anode, into said tank, through the electrolyte in said tank, and out of said tank.

5. In an electroplating apparatus, a tank divided by a partition so as to provide the tank with longitudinally extending compartments adapted to contain an electrolyte, said compartments having a means of communication at their respective ends, agitating devices located in said compartments for producing a continuous circulation of the electrolyte through said compartments, means for continuously drawing a band of metal, forming the cathode, into said tank, through the electrolyte in said tank, and out of said tank, means for drawing wire, forming the anode, into said tank, through the electrolyte in said tank, and out of said tank, and a cutting means for severing the electroplated band into sections.

6. In an electroplating apparatus, a tank adapted to contain an electrolyte, cylindrically formed tubular elements located at each end within said tank, a longitudinally extending partition within said tank and extending from one tubular element to the other tubular element, so as to provide the tank with longitudinally extending compartments, each tubular element having a lower and an upper cut-away portion providing a means of communication between said compartments, a vertical rotary spindle in each tubular element, and a propeller connected with each spindle and located within each tubular element, all arranged for producing a continuous circulation of the electrolyte through said compartments.

7. In an electroplating apparatus, a tank adapted to contain an electrolyte, cylindrically formed tubular elements located at each end within said tank, a longitudinally extending partition within said tank and extending from one tubular element to the other tubular element, so as to provide the tank with longitudinally extending compartments, each tubular element having a lower and an upper cut-away portion providing a means of communication between said compartments, a vertical rotary spindle in each tubular element, and a propeller connected with each spindle and located within each tubular element, all arranged for producing a continuous circulation of the electrolyte through said compartments, means for continuously drawing a band of metal, forming the cathode, into said tank, through the electrolyte in said tank, and out of said tank, and means for drawing wire, forming the anode, into said tank, through the electrolyte in said tank, and out of said tank.

8. In an electroplating apparatus, a tank adapted to contain an electrolyte, cylindrically formed tubular elements located at each end within said tank, a longitudinally extending partition within said tank and extending from one tubular element to the other tubular element, so as to provide the tank with longitudinally extending compartments, each tubular element having a lower and an upper cut-away portion providing a means of communication between said compartments, a vertical rotary spindle in each tubular element, a propeller connected with each spindle and located within each tubular element, all arranged for producing a continuous circulation of the electrolyte through said compartments, means for continuously drawing a band of metal, forming the cathode, into said tank, through the electrolyte in said tank, and out of said tank, means for drawing wire, forming the anode, into said tank, through the electrolyte in said tank and out of said tank, and a cutting means for severing the electroplated band into sections.

9. In an electroplating apparatus, a tank adapted to contain an electrolyte, means for continuously drawing a band of metal, forming the cathode, in one direction into the tank, through the electrolyte in said tank, and out of said tank, means for drawing wire, forming the anode, into said tank, through the electrolyte in said tank, and out of said tank, and means for reversing the direction of the wire and causing the wire to be again drawn into the tank, through the electrolyte therein, and out of the tank.

10. In an electroplating apparatus, a tank adapted to contain an electrolyte, means for continuously drawing a band of metal, forming the cathode, in one direction into the tank, through the electrolyte in said tank, and out of said tank, means for drawing wire, forming the anode, into said tank, through the electrolyte in said tank, and out of said tank, and means for reversing the direction of the wire and causing the wire to be again drawn into the tank, through the electrolyte therein, and out of the tank, and a cutting means for severing the electroplated band into sections.

11. In an electroplating apparatus, a tank divided by a partition so as to provide the tank with longitudinally extending compartments adapted to contain an electrolyte, said compartments having a means of communication at their respective ends, agitating devices located in said compartments for producing a continuous circulation of electrolyte through said compartments, means for continuously drawing a band of metal, forming the cathode, in one direction into the tank, through the electrolyte in said tank, and out of said tank, means for drawing wire, forming the anode, into said tank, through the electrolyte in said tank, and out of said tank, and means for reversing the direction of the wire and causing the wire to be again drawn into the tank, through the electrolyte therein, and out of the tank.

12. In an electroplating apparatus, a tank divided by a partition so as to provide the tank with longitudinally extending compartments adapted to contain an electrolyte, said compartments having a means of communication at their respective ends, agitating devices located in said compartments for producing a continuous circulation of the electrolyte through said compartments, means for continuously drawing a band of metal, forming the cathode, in one direction into the tank, through the electrolyte in said tank, and out of said tank, means for drawing wire, forming the anode, into said tank, through the electrolyte in said tank, and out of said tank, and means for reversing the direction of the wire and causing the wire to be again drawn into the tank, through the electrolyte therein, and out of the tank, and a cutting means for severing the electroplated band into sections.

13. In an electroplating apparatus, a tank adapted to contain an electrolyte, guiding hangers mounted in said tank, each hanger being provided with a laterally extending elongated opening for the support therein of a metal band, forming the cathode, means for drawing said band into said tank, through said elongated openings, and out of said tank, said hangers being also provided with a plurality of holes for the support therein of wires, forming anodes, and means for drawing said wires into the tank, through the holes in said hangers, and out of said tank.

14. In an electroplating apparatus, a tank adapted to contain an electrolyte, guiding hangers mounted in said tank, each hanger being provided with a laterally extending elongated opening for the support therein of a metal band, forming the cathode, means for drawing said band into said tank, through said elongated openings, and out of said tank, said hangers being also provided with a plurality of holes, for the support therein of wires, forming anodes, means for drawing said wires into the tank, through the holes in said hangers, and out of said tank, and a cutting means for severing the electroplated band into sections.

15. In an electroplating apparatus, a tank adapted to contain an electrolyte, guiding hangers mounted in said tank, each hanger being provided with a laterally extending elongated opening for the support therein of a metal band, forming the cathode, means for drawing said band into said tank, through said elongated openings, and out of said tank, said hangers being also provided with a plurality of holes, located in planes above and below the elongated opening in each hanger, for the support therein of wires, forming anodes, and means for drawing said wires into the tank, through the upper and lower rows of holes in said hangers, and out of said tank.

16. In an electroplating apparatus, a tank adapted to contain an electrolyte, guiding hangers mounted in said tank, each hanger being provided with a laterally extending elongated opening for the support therein of a metal band, forming the cathode, means for drawing said band into said tank, through said elongated openings, and out of said tank, said hangers being also provided with a plurality of holes, located in planes above and below the elongated opening in each hanger, for the support therein of wires, forming anodes, means for drawing said wires into the tank, through the upper and lower rows of holes in said hangers, and out of said tank, and a cutting means for severing the electroplated band into sections.

17. In an electroplating apparatus, a tank adapted to contain an electrolyte, guiding hangers mounted in said tank, each hanger being provided with a laterally extending elongated opening for the support therein of a metal band, forming the cathode, means for drawing said band into said tank, through said elongated openings, and out of said tank, said hangers being also provided with a plurality of holes for the support therein of wires, forming anodes, means for drawing said wires into said tank, through some of said openings, and out of the tank, and means for reversing the direction of said wires and causing the wires to be again drawn into the tank, through others of said openings in said hangers, and out of the tank.

18. In an electroplating apparatus, a tank adapted to contain an electrolyte, guiding hangers mounted in said tank, each hanger being provided with a laterally extending elongated opening for the support therein of a metal band, forming the cathode, means for drawing said band into said tank, through said elongated openings, and out of said tank, said hangers being also provided with a plurality of holes for the support therein of wires, forming anodes, means for drawing said wires into said tank, through some of said openings, and out of the tank, and means for reversing the direction of said wires and causing the wires to be again drawn into the tank, through others of said openings in said hangers, and out of the tank, and a cutting means for severing the electroplated band into sections.

19. In an electroplating apparatus, a tank adapted to contain an electrolyte, guiding hangers mounted in said tank, each hanger being provided with a laterally extending elongated opening for the support therein of a metal band, forming the cathode, means for drawing said band into said tank, through said elongated openings, and out of said tank, said hangers being also provided with a plurality of holes, located in planes above and below the elongated opening in each hanger for the support therein of wires, forming anodes, means for drawing said wires into said tank, through some of the holes in the upper row and through some of the holes in the lower row of said holes in the hangers, and out of the tank, and means for reversing the direction of said wires and causing the wires to be again drawn into the tank, through some of the holes in the upper row and through some of the holes in the lower row of said holes in the hangers, and out of said tank, substantially as and for the purposes set forth.

20. In an electroplating apparatus, a tank adapted to contain an electrolyte, guiding hangers mounted in said tank, each hanger being provided with a laterally extending elongated opening for the support therein of a metal band, forming the cathode, means for drawing said band into said tank, through said elongated openings, and out of said tank, said hangers being also provided with a plurality of holes located in planes above and below the elongated opening in each hanger for the support therein of wires, forming anodes, means for drawing said wires into said tank, through some of the holes in the upper row and through some of the holes in the lower row of said holes in the hangers, and out of the tank, and means for reversing the direction of said wires and causing the wires to be again drawn into the tank, through some of the holes in the upper row and through some of the holes in the lower row of said holes in the hangers, and out of said tank, and a cutting means for severing the electroplated band into sections.

21. In an electroplating apparatus, a tank adapted to contain an electrolyte, a reel at one end of said tank upon which is wound a metal band, forming the cathode, feed-rollers at the other end of the tank for drawing said band into the tank, through the electrolyte in said tank, and out of said tank, winding-off reels located at one end of said tank carrying wires, forming anodes, means at the other end of the tank for drawing the wires into the tank, through the electrolyte therein, and out of the tank, and winding-up reels located at the end of the tank with said winding-off reels for drawing the wires back into the tank, through the electrolyte therein, and out of the tank, substantially as and for the purposes set forth.

22. In an electroplating apparatus, a tank adapted to contain an electrolyte, a reel at one end of said tank upon which is wound a metal band, forming the cathode, feed-rollers at the other end of the tank for drawing said band into the tank, through the electrolyte in said tank, and out of said tank, winding-off reels located at one end of said tank carrying wires, forming anodes, means at the other end of the tank for drawing the wires into the tank, through the electrolyte therein, and out of the tank, and winding-up reels located at the end of the tank with said winding-off reels for drawing the wires back into the tank, through the electrolyte therein, and out of the tank, and a cutting means for severing the electroplated band into sections.

23. In an electroplating apparatus, a tank adapted to contain an electrolyte, a reel at one end of said tank upon which is wound a metal band, forming the cathode, feed-rollers at the other end of the tank for drawing said band into the tank, through the electrolyte in said tank, and out of said tank, winding-off reels located at one end of said tank carrying wires, forming anodes, means at the other end of the tank for drawing the wires into the tank, through the electrolyte therein, and out of the tank, and differentially rotatable winding-up reels located at the end of the tank with said winding-off reels for drawing the wires back into the tank, through the electrolyte therein, and out of the tank, substantially as and for the purposes set forth.

24. In an electroplating apparatus, a tank adapted to contain an electrolyte, a reel at one end of said tank upon which is wound a metal band, forming the cathode, feed-rollers at the other end of the tank for drawing said band into the tank, through the electrolyte in said tank, and out of said tank, winding-off reels located at one end of said tank carrying wires, forming anodes, means at the other end of the tank for drawing the wires into the tank, through the electrolyte therein, and out of the tank, and differentially rotatable winding-up reels located at the end of the tank with said winding-off reels for drawing the wires back into the tank, through the electrolyte therein, and out of the tank, and a cutting means for severing the electroplated band into sections.

25. In an electroplating apparatus, a tank adapted to contain an electrolyte, a reel at one end of said tank upon which is wound a metal band, forming the cathode, feed-rollers at the other end of the tank for drawing said band into the tank, through the electrolyte in said tank, and out of said tank, winding-off reels located at one end of said tank carrying wires, forming anodes, means at the other end of the tank for drawing the wires into the tank, through the electrolyte therein, and out of the tank, and winding-up reels located at the end of the tank with said winding-off reels for drawing the wires back into the tank, through the electrolyte therein, and out of the tank, and tension-rollers about which said out-coming wires pass before being reeled upon said winding-up reels, substantially as and for the purposes set forth.

26. In an electroplating apparatus, a tank adapted to contain an electrolyte, a reel at one end of said tank upon which is wound a metal band, forming the cathode, feed-rollers at the other end of the tank for drawing said band into the tank, through the electrolyte in said tank, and out of said tank, winding-off reels located at one end of said tank carrying wires, forming anodes, means at the other end of the tank for drawing the wires into the tank, through the electrolyte therein, and out of the tank, and differentially rotatable winding-up reels located at the end of the tank with said winding-off reels for drawing the wires back into the tank, through the electrolyte therein, and out of the tank, and tension-rollers about which said out-coming wires pass before being reeled upon said winding-up reels, substantially as and for the purposes set forth.

27. In an electroplating apparatus, a tank adapted to contain an electrolyte, means for continuously drawing a band of metal, forming the cathode, into said tank, through the electrolyte in said tank, and out of said tank, means for drawing strands of wire, forming the anode, into said tank, through the electrolyte in said tank, and out of said tank, and means for reversing the direction of said wires and causing the wires to be again drawn into the tank, through the electrolyte in said tank, and out of the tank, said reversing means consisting of a frame provided with open portion, and grooved wheels over which the wires are passed, substantially as and for the purposes set forth.

28. In an electroplating apparatus, a tank adapted to contain an electrolyte, means for continuously drawing a band of metal, forming the cathode, into said tank, through the electrolyte in said tank, and out of said tank, means for drawing strands of wire, forming the anode, into said tank, through the electrolyte in said tank, and out of said tank, and means for reversing the direction of said wires and causing the wires to be again drawn into the tank, through the electrolyte in said tank, and out of the tank, said reversing means consisting of a frame provided with open portion, and grooved wheels over which the wires are passed, and a chute-like guide also carried by said frame over which the said metal band passes and is directed into the electroplating tank, substantially as and for the purposes set forth.

29. In an electroplating apparatus, a tank adapted to contain an electrolyte, means for continuously drawing a band of metal, forming the cathode, into said tank, through the electrolyte in said tank, and out of said tank, means for drawing strands of wire, forming the anode, into said tank, through the electrolyte in said tank, and out of said tank, and means for reversing the direction of said wires and causing the wires to be again drawn into the tank, through the electrolyte in said tank, and out of the tank, said reversing means consisting of a frame provided with open portions, and grooved wheels over which the wires are passed, and a chute-like guide also carried by said frame over which the said metal band passes and is directed into the electroplating tank, combined with brushes in sliding contact with the wires as they pass over said grooved wheels, and electrical conductors in circuit with said brushes and said chute-like guide.

30. In an electroplating apparatus, a tank adapted to contain an electrolyte, means for continuously drawing a band of metal, forming the cathode, into said tank, through the electrolyte in said tank, and out of said tank, means for drawing wire, forming the anode, into said tank, through the electrolyte in said tank, and out of said tank a cutting means for severing the electroplated band into sections, comprising a cutting base and a normally raised pivoted and spring-controlled cutter-arm, a solenoid having a plunger, a means of connection between said plunger and said cutter-arm, an electric circuit in which said solenoid is arranged, and a switch-contact in said circuit adapted to be actuated by the outwardly moving electroplated band for energizing said solenoid and thereby actuating said cutter-arm, substantially as and for the purposes set forth.

31. In an electroplating apparatus, a tank adapted to contain an electrolyte, means for continuously drawing a band of metal, forming the cathode, into said tank, through the electrolyte in said tank, and out of said tank, means for drawing wire, forming the anode, into said tank, through the electrolyte in said tank, and out of said tank, a cutting means for severing the electroplated band into sections, comprising a cutting base and a normally raised pivoted and spring-controlled cutter-arm, a solenoid having a plunger, a means of connection between said plunger and said cutter-arm, an electric circuit in which said solenoid is arranged, and a switch-contact in said circuit adapted to be actuated by the outwardly moving electroplated band for energizing said solenoid and thereby actuating said cutter-arm, and means connected with said cutter-arm for interrupting the electric circuit through said solenoid.

32. In an electroplating apparatus, a tank adapted to contain an electrolyte, means for continuously drawing a band of metal, forming the cathode, into said tank, through the electrolyte in said tank, and out of said tank, means for drawing wire, forming the anode, into said tank, through the electrolyte in said tank, and out of said tank, a cutting means for severing the electroplated band into sections, comprising a cutting base and a normally raised pivoted and spring-controlled cutter-arm, a solenoid having a plunger, a means of connection between said plunger and said cutter-arm, an electric circuit in which said solenoid is arranged and a switch-contact in said circuit adapted to be actuated by the outwardly moving electroplated band for energizing said solenoid and thereby actuating said cutter-arm, and means connected with said cutter-arm for interrupting the electric circuit through said solenoid, consisting of an electric switch connected with and operated by the downward movement of said cutter-arm, a second solenoid, and an electric circuit in which said last-mentioned solenoid and said last-mentioned electric switch are arranged, substantially as and for the purposes set forth.

In testimony that I claim the invention set forth above I have hereunto set my hand this 4th day of Dec. 1912.

FREDERICK A. FELDKAMP.

Witnesses:
FREDK. C. FRAENTZEL,
FREDK. H. W. FRAENTZEL.